United States Patent
Wang

(10) Patent No.: US 10,540,942 B2
(45) Date of Patent: Jan. 21, 2020

(54) OPTIMIZATION METHOD AND PRE-STAGE DEVICE FOR BRIGHTNESS COMPENSATION

(71) Applicants: HKC Corporation Limited, Shenzhen, Guangdong (CN); Chongqing HKC Optoelectronics Technology Co., Ltd., Chongqing (CN)

(72) Inventor: Mingliang Wang, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 20 days.

(21) Appl. No.: 15/580,412

(22) PCT Filed: Sep. 18, 2017

(86) PCT No.: PCT/CN2017/102014
§ 371 (c)(1),
(2) Date: Dec. 7, 2017

(87) PCT Pub. No.: WO2019/037169
PCT Pub. Date: Feb. 28, 2019

(65) Prior Publication Data
US 2019/0066627 A1  Feb. 28, 2019

(30) Foreign Application Priority Data
Aug. 25, 2017  (CN) .......................... 2017 1 0744019

(51) Int. Cl.
*G09G 5/10* (2006.01)
*G06T 7/00* (2017.01)
(Continued)

(52) U.S. Cl.
CPC ............. *G09G 5/10* (2013.01); *G06T 7/0002* (2013.01); *G09G 3/3208* (2013.01);
(Continued)

(58) Field of Classification Search
None
See application file for complete search history.

(56) References Cited

U.S. PATENT DOCUMENTS 6,677,948 B1 * 1/2004 Wasserman ............. G06T 5/002
345/428
2003/0063383 A1 * 4/2003 Costales ................ G02B 21/22
359/464
(Continued)

FOREIGN PATENT DOCUMENTS

CN  105632443 A  6/2016
CN  106161981 A  11/2016
(Continued)

OTHER PUBLICATIONS

International Search Report Based on PCT/CN2017/102014; dated May 25, 2018.

*Primary Examiner* — Kee M Tung
*Assistant Examiner* — Patrick F Valdez
(74) *Attorney, Agent, or Firm* — Muncy, Geissler, Olds & Lowe, P.C.

(57) ABSTRACT

An optimization method and a pre-stage device for brightness compensation, includes: providing a brightness obtaining apparatus; photographing a to-be-compensated panel to obtain a brightness compensation reference frame, where the to-be-compensated panel has first pixel units, the brightness obtaining apparatus has second pixel units, the brightness compensation reference frame includes photographing units, and the photographing unit includes second pixel units, where the second pixel unit is bigger than the first pixel unit; using four second pixel units at four endpoints of each of the
(Continued)

photographing units as brightness references, and obtaining pieces of brightness compensation data of the other second pixel units in the photographing unit by using a specific operation mode; and performing brightness compensation for the first pixel units corresponding to each of the photographing units by using the pieces of brightness compensation data.

5 Claims, 11 Drawing Sheets

(51) Int. Cl.
 *G09G 3/3208* (2016.01)
 *H04N 5/372* (2011.01)
(52) U.S. Cl.
 CPC .............. *G06T 2207/30121* (2013.01); *G09G 2320/0233* (2013.01); *G09G 2320/0673* (2013.01); *H04N 5/372* (2013.01)

(56) References Cited

U.S. PATENT DOCUMENTS

| | | | |
|---|---|---|---|
| 2006/0192860 A1* | 8/2006 | Atsumi | H04N 1/33307 348/222.1 |
| 2010/0013750 A1* | 1/2010 | Kerofsky | G09G 3/006 345/89 |
| 2013/0010016 A1* | 1/2013 | Sasaki | G09G 3/20 345/690 |
| 2015/0070403 A1* | 3/2015 | Kim | G09G 3/3607 345/690 |
| 2017/0256187 A1* | 9/2017 | Zhang | G09G 3/36 |
| 2018/0322834 A1* | 11/2018 | Zhang | G09G 3/3607 |
| 2019/0052872 A1* | 2/2019 | Shyshkin | G01J 1/0228 |

FOREIGN PATENT DOCUMENTS

| | | |
|---|---|---|
| CN | 106341617 A | 1/2017 |
| CN | 106952629 A | 7/2017 |
| JP | H08181910 A | 7/1996 |

* cited by examiner

US 10,540,942 B2

OPTIMIZATION METHOD AND PRE-STAGE DEVICE FOR BRIGHTNESS COMPENSATION

BACKGROUND

Technical Field

The present invention relates to an optimization method and a pre-stage device for brightness compensation, and in particular, to an optimization method and a pre-stage device for achieving brightness compensation by changing a camera resolution.

Related Art

Planar displays have s numerous advantages such as a thin body, power-saving, and no radiation, and are widely used. Existing planar displays mainly include Liquid Crystal Display (LCDs) and Organic Light Emitting Displays (OLEDs). Because of having advantageous characteristics, such as self-illumination without using a backlight source, high contrast, small thickens, high response speeds, applicability to flexible curve panels, broad service temperature ranges, and relatively simple structures and processes, the OLEDs are considered to be novel application technologies of next-generation planar displays. However, because in an OLED display, OLED components may be different in terms of luminance because of losses in a process or use, a non-uniform brightness phenomenon (Mura effect) is likely to occur.

Currently, because of reasons such as a production process, a to-be-compensated area with non-uniform brightness (Mura) may often occur in a production process of a planar display panel, and a bright spot or a dark spot occurs, resulting degradation of display quality of the panel. A brightness compensation (Demura) technology is a technology of removing display Mura, to make screen brightness uniform. A basic principle of the Demura technology is: making the panel display a gray level screen, photographing a to-be-compensated panel by using a brightness obtaining apparatus, for example, using a capacitive coupling component camera (Charge Coupled Device, CCD), obtaining a brightness value of each pixel unit in the to-be-compensated panel, and then, adjusting a gray level or a voltage of a pixel unit in an area of a to-be-compensated position (Mura), to brighten an excessively dark area or darken an excessively bright area, thereby achieving a uniform display effect.

However, currently, a Demura device generally requires a camera capable of accurately photographing a pixel unit. In this way, an advantage is that a most accurate value of a to-be-compensated position (Mura) can be obtained. However, high requirements are raised on a resolution and calculating and processing capabilities of a Demura camera, and there is no capability of compensating for relatively small Mura.

Further, when the Demura technology is applied to actual production, not only a good display effect is required, but also a short consumed time is required. Therefore, a good and practical Demura algorithm is needed. In a Demura algorithm used in the prior art, a gray level after correction is usually estimated according to a gamma value and target brightness. In an OLED display panel, gamma curves of respective pixels, particularly, in a Mura area, are greatly different from each other, and an expected compensation effect cannot be achieved by performing estimation once according to a uniform gamma value or gamma curve.

However, currently, this technology uses a central area of a to-be-compensated panel as a reference point, obtains a difference by comparing brightness of an other to-be-compensated position area with brightness of the central area, and further calculates, according to a standard gamma curve (Gamma 2.2 curve), brightness compensation data (including compensation brightness and a compensation gray level) needed to compensate, so as to make brightness of the entire panel uniform.

At present, this approach is relatively simple and easy. However, a premise of calculating the brightness compensation data is assuming that the to-be-compensated panel is already of a standard gamma 2.2 curve. However, in an actual production process of panels, it is impossible to perform accurate management and control on a gamma curve of each panel. In addition, a to-be-compensated position (Mura) at a central point usually cannot be removed. Consequently, a final effect of Demura is relatively likely to be affected.

Meanwhile, calculation is performed for each area by default, and in addition, to ensure a Demura effect, a smallest unit in an area of a to-be-compensated position cannot be excessively large (usually including 8*8 pixel units). Therefore, a volume of final brightness compensation data of the entire to-be-compensated panel is relatively large, and accordingly, an external memory (Demura flash) needs to have a relatively large capacity, an internal RAM of a processing IC on a driver board also needs to be relatively large, and further, limitations in a data transmission time and rate would be caused.

SUMMARY

To resolve the foregoing technical problem, an objective of the present invention is to provide enlarging a photographing unit of a brightness obtaining apparatus (Demura camera) from a single pixel unit to a specific area (for example, 2×2 pixel units), so that by comprehensively determining brightness of this relatively large area, a capability of compensating for small Mura can be enhanced while reducing a resolution of a Demura camera.

To resolve the technical problem of the present invention, an optimization method for brightness compensation, in particular, an optimization method for achieving brightness compensation by changing a camera resolution, is used in the present invention. By changing the camera resolution, a requirement on a resolution specification of a Demura camera can be lowered, and a brightness compensation capability for small Mura can be enhanced in the present invention.

The objective of the present invention may further be achieved and the technical problem of the present invention may further be resolved by taking the following technical measures.

The present invention provides an optimization method for brightness compensation, comprising: providing a brightness obtaining apparatus; photographing, by the brightness obtaining apparatus, a to-be-compensated panel to obtain a brightness compensation reference frame, where the to-be-compensated panel has a first resolution, the first resolution is defined by a plurality of first pixel units of a two-dimensional array, the brightness obtaining apparatus has a second resolution, the second resolution is defined by a plurality of second pixel units of a two-dimensional array, the brightness compensation reference frame comprises a plurality of photographing units, and the photographing unit comprises a plurality of second pixel units, where the second pixel unit is bigger than the first pixel unit; using four second pixel units at four endpoints of each of the photographing units as brightness references, and obtaining a plurality of pieces of brightness compensation data of the other second pixel units in the photographing unit by using a specific operation mode; and performing brightness compensation for the first pixel units corresponding to each of the photographing units by using the pieces of brightness compensation data.

In an embodiment of the present invention, the brightness obtaining apparatus is a capacitive coupling component camera.

In an embodiment of the present invention, the first resolution is an ultrahigh resolution defined by first pixel units arranged in a 3840*2160 array.

In an embodiment of the present invention, side lengths of the second pixel unit are respectively two times side lengths of the first pixel unit.

In an embodiment of the present invention, a quantity of second pixel units defining the second resolution is ¼ of a quantity of first pixel units defining the first resolution.

In an embodiment of the present invention, the specific operation mode is a linear operation.

The objective of the present invention may further be achieved and the technical problem of the present invention may further be resolved by taking the following technical measures.

The present invention provides a pre-stage device for brightness compensation, comprising: a to-be-compensated panel, having a first resolution, where the first resolution is defined by a plurality of first pixel units of a two-dimensional array; and a brightness obtaining apparatus, having a second resolution, where the second resolution is defined by a plurality of second pixel units of a two-dimensional array, and configured to photograph the to-be-compensated panel to obtain a brightness compensation reference frame, where the brightness compensation reference frame comprises a plurality of photographing units, and the photographing unit comprises a plurality of second pixel units, where the second pixel unit is bigger than the first pixel unit.

In the foregoing embodiment of the present invention, the brightness obtaining apparatus is a capacitive coupling component camera.

To resolve the foregoing technical problem, an objective of the present invention is to provide an optimization method for brightness compensation, in particular, an optimization method for brightness compensation by measuring a reference point sampling area in advance. By measuring the reference point sampling area in advance, a gamma curve at a center of a panel may be measured and compensated for in advance, and Mura at the center of the panel is removed to make the gamma curve achieve the standard gamma 2.2, thereby achieving a most accurate compensation effect.

The objective of the present invention may further be achieved and the technical problem of the present invention may further be resolved by taking the following technical measures.

The present invention provides an optimization method for brightness compensation, comprising: setting a compensation reference sampling area on a to-be-compensated panel, where the to-be-compensated panel has a first resolution, and the first resolution is defined by a plurality of first pixel units of a two-dimensional array; providing a brightness obtaining apparatus, and photographing, by the brightness obtaining apparatus, the compensation reference sampling area to obtain a sampling frame, where the sampling frame comprises a plurality of photographing units, and the pieces of photographing units may correspond to a plurality of first pixel units comprised in the compensation reference sampling area, where each photographing unit may correspond to a plurality of first pixel units; measuring brightness uniformity of all of the photographing units in the sampling frame, selecting one of the photographing units having good brightness uniformity as a sampling and photographing unit, and using brightness of the sampling and photographing unit as a compensation reference value; applying the compensation reference value according to a specific operation mode to obtain a compensation reference curve; photographing, by the brightness obtaining apparatus, the to-be-compensated panel to obtain a brightness compensation reference frame, where the brightness compensation reference frame comprises a plurality of photographing units; applying brightness of all photographing units in the brightness compensation reference frame to the compensation reference curve, and calculating a plurality of pieces of brightness compensation data of the first pixel units corresponding to the photographing units; and performing brightness compensation for the first pixel units according to the pieces of brightness compensation data.

In an embodiment of the present invention, the compensation reference sampling area is in a central area of the to-be-compensated panel.

In an embodiment of the present invention, the brightness obtaining apparatus is a capacitive coupling component camera.

In an embodiment of the present invention, each photographing unit may correspond to 8×8 first pixel units.

In an embodiment of the present invention, the first resolution is an ultrahigh resolution defined by first pixel units arranged in a 3840*2160 array.

In an embodiment of the present invention, the specific operation mode is estimating the compensation reference curve according to a gamma value and target brightness.

In an embodiment of the present invention, the specific operation mode is a gamma 2.2 curve.

The objective of the present invention may further be achieved and the technical problem of the present invention may further be resolved by taking the following technical measures.

The present invention provides an optimization device for brightness compensation, comprising: a to-be-compensated panel, having a first resolution, where the first resolution is defined by a plurality of first pixel units of a two-dimensional array; a brightness obtaining apparatus, configured to photograph the to-be-compensated panel to obtain a frame, the frame comprises a plurality of photographing units, and the photographing units may correspond to the plurality of first pixel units; a brightness measurement unit, configured to measure brightness uniformity of the photographing units in the frame and obtain a brightness reference value; a brightness comparison unit, configured to perform comparison to obtain a difference between brightness of each of the photographing units and the brightness reference value; a calculation unit, calculating, according to the difference between brightness of each of the photographing units and the brightness reference value, a plurality of brightness compensation data of each of the photographing units; and a brightness compensation unit, increasing or decreasing brightness of each of the first pixel units according to the pieces of brightness compensation data, and performing positive-direction or negative-direction brightness compensation for each of the first pixel units.

To resolve the foregoing technical problem, an objective of the present invention is to provide an optimization method for a brightness compensation data volume, in particular, an optimization method for a brightness compensation data volume implemented by using information stored in an external memory. A difference between brightness of each to-be-compensated position area and brightness of a reference point may be determined by using information stored in an external memory, and no compensation is made for an area of a to-be-compensated position having a relatively small difference, so that a total brightness compensation data volume of Demura is reduced.

The objective of the present invention may further be achieved and the technical problem of the present invention may further be resolved by taking the following technical measures.

The present invention provides an optimization method for a brightness compensation data volume, comprising: providing a to-be-compensated panel, where the to-be-compensated panel has a brightness compensation data memory, storing a plurality of pieces of brightness compensation data of the to-be-compensated panel; externally connecting a data processor, where the data processor comprises an external memory, and the external memory stores a piece of determination information for determining whether the pieces of brightness compensation data need to be compensated; reading, by the data processor, the pieces of brightness compensation data, classifying, according to the determination information, the pieces of brightness compensation data into a plurality of pieces of to-be-compensated data and a plurality of pieces of not-to-be-compensated data, and storing the plurality of pieces of to-be-compensated data and not-to-be-compensated data after determination into the external memory; and reading and storing, by the brightness compensation data memory, the pieces of to-be-compensated data in the external memory.

In an embodiment of the present invention, the brightness compensation data memory compares brightness of a reference point of the to-be-compensated panel with brightness of a plurality of to-be-compensated positions, and calculates, according to a specific operation mode, a plurality of pieces of brightness compensation data corresponding to the plurality of to-be-compensated positions.

In an embodiment of the present invention, the specific operation mode is a gamma 2.2 curve.

In an embodiment of the present invention, the data processor is a timing controller.

In an embodiment of the present invention, according to the determination information, the to-be-compensated data is determined to be 1, and the not-to-be-compensated data is determined to be 0.

In an embodiment of the present invention, the brightness compensation data memory reads and stores pieces of data determined to be 1 in the external memory.

The objective of the present invention may further be achieved and the technical problem of the present invention may further be resolved by taking the following technical measures.

The present invention provides an optimization device for a brightness compensation data volume, comprising: a to-be-compensated panel, comprising a brightness compensation data memory, storing a plurality of brightness compensation data; a data processor, externally connected to the to-be-compensated panel and configured to read the pieces of brightness compensation data; and an external memory, storing a piece of determination information, provided to the data processor for determining the pieces of brightness compensation data to be a plurality of pieces of to-be-compensated data and a plurality of pieces of not-to-be-compensated data, where the brightness compensation data memory may read and store the pieces of to-be-compensated data in the external memory.

In the foregoing embodiment of the present invention, the data processor is a timing controller.

Upon improvement in the present invention, the foregoing apparatus application problem is effectively overcome, and further, such an apparatus may be configured to: 1. enhance a capability of compensating for small Mura while reducing a resolution of a Demura camera by comprehensively determining brightness in a relatively large scope of pixel units; 2. measure and compensate for a gamma curve at a center of a panel in advance by measuring a sampling area in advance, and remove Mura at the center of the panel to make the gamma curve achieve the standard gamma 2.2, thereby achieving a most accurate compensation effect; 3. determine a difference between brightness of each to-be-compensated position area and brightness of a reference point by using information stored in an external memory, and make no compensation for an area of a to-be-compensated position having a relatively small difference, so as to reduce a total brightness compensation data volume of Demura.

DETAILED DESCRIPTION

The following embodiments are described with reference to the accompanying drawings, and are used to exemplify particular embodiments for implementation of the present invention. Terms about directions mentioned in the present invention, such as "on", "below", "front", "back", "left", "right", "in", "out", and "side surface" merely refer to directions in the accompanying drawings. Therefore, the used terms about directions are used to describe and understand the present invention, and are not intended to limit the present invention.

The accompanying drawings and the description are considered to be essentially exemplary, rather than limitative. In the figures, units with similar structures are represented by using the same reference number. In addition, for understanding and ease of description, the size and the thickness of each component shown in the accompanying drawings are arbitrarily shown, but the present invention is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, throughout this specification, unless otherwise explicitly described to have an opposite meaning, the word "include" is understood as including the component, but not excluding any other component. In addition, throughout this specification, "on" means that one is located above or below a target component and does not necessarily mean that one is located on the top based on a gravity direction.

To further describe the technical measures taken in the present invention for achieving a predetermined invention objective and effects, specific implementations, structures, features, and effects of an optimization method and a pre-stage device for brightness compensation provided according to the present invention are described below in detail with reference to the accompanying drawings and preferred embodiments.

Currently, because of reasons such as a production process, a to-be-compensated area with non-uniform brightness (Mura) may often occur in a production process of a planar display panel, and a bright spot or a dark spot occurs, resulting degradation of display quality of the panel. A brightness compensation (Demura) technology is a technology of removing display Mura, to make screen brightness uniform.

Figure 1A:
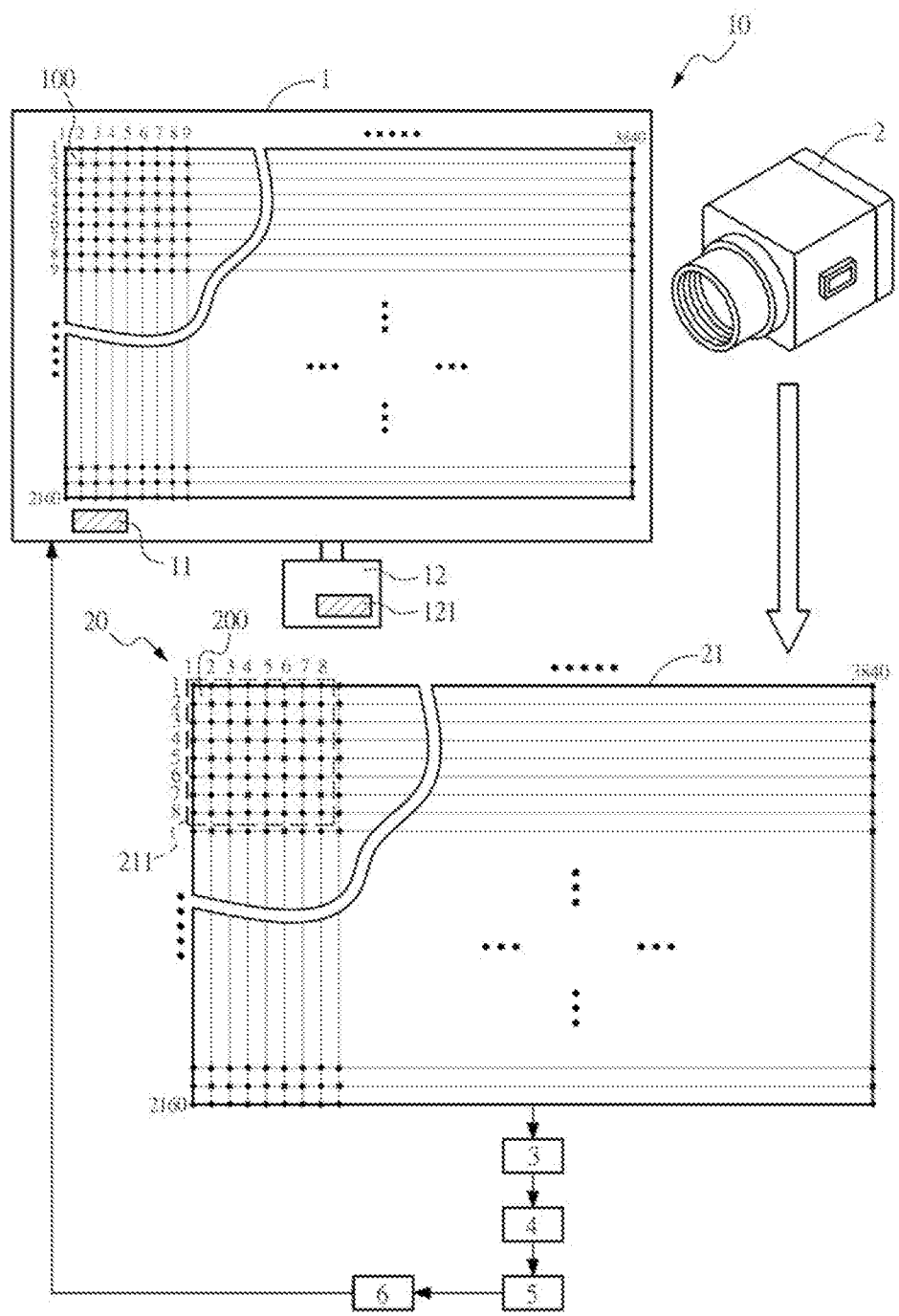
FIG. 1A is a schematic diagram of a brightness compensation device according to the present invention.

First referring to FIG. 1A, FIG. 1A is a schematic diagram of a brightness compensation device according to the present invention. As shown in FIG. 1A, a basic principle of a Demura technology is making a to-be-compensated panel 1, for which brightness compensation has not been performed, display a gray level screen, photographing the to-be-compensated panel 1 by using a brightness obtaining apparatus 2, for example, using a capacitive coupling component camera (Charge Coupled Device, CCD) to obtain a brightness compensation reference frame 21 (having a second resolution 20 defined by second pixel units 200, using an ultrahigh resolution, 3840×2160, as an example as shown in the figure), obtaining a brightness value of each pixel unit 100 in the to-be-compensated panel 1 (having a first resolution 10 defined by first pixel units 100, using an ultrahigh resolution, 3840×2160, as an example as shown in the figure), and then measuring brightness uniformity of a photographing unit 211 of the brightness compensation reference frame 21 by sequentially using a brightness measurement unit 3, a brightness comparison unit 4, a calculation unit 5 and a brightness compensation unit 6; selecting a reference point for brightness reference to further perform brightness comparison on a pixel at a to-be-compensated position and calculate brightness compensation data needing to be adjusted, and adjusting a gray level or a voltage of a pixel unit in an area of a to-be-compensated position (Mura), to brighten an excessively dark area or darken an excessively bright area, thereby achieving a uniform display effect. The brightness compensation data is stored in a brightness compensation data memory 11 of the panel, and when a power supply of the panel is started, an externally-connected data processor 12 reads the brightness compensation data in the brightness compensation data memory 11, and stores it into an external memory 121 of the data processor 12.

When the Demura technology is applied to actual production, not only a good display effect is required, but also a short consumed time is required. Therefore, a good and practical Demura algorithm is needed. In a Demura algorithm used in the prior art, a gray level after correction is usually estimated according to a gamma value and target brightness. In an OLED display panel, gamma curves of respective pixels, particularly, in a Mura area, are greatly different from each other, and an expected compensation effect cannot be achieved by performing estimation once according to a uniform gamma value or gamma curve.

Figure 1B:
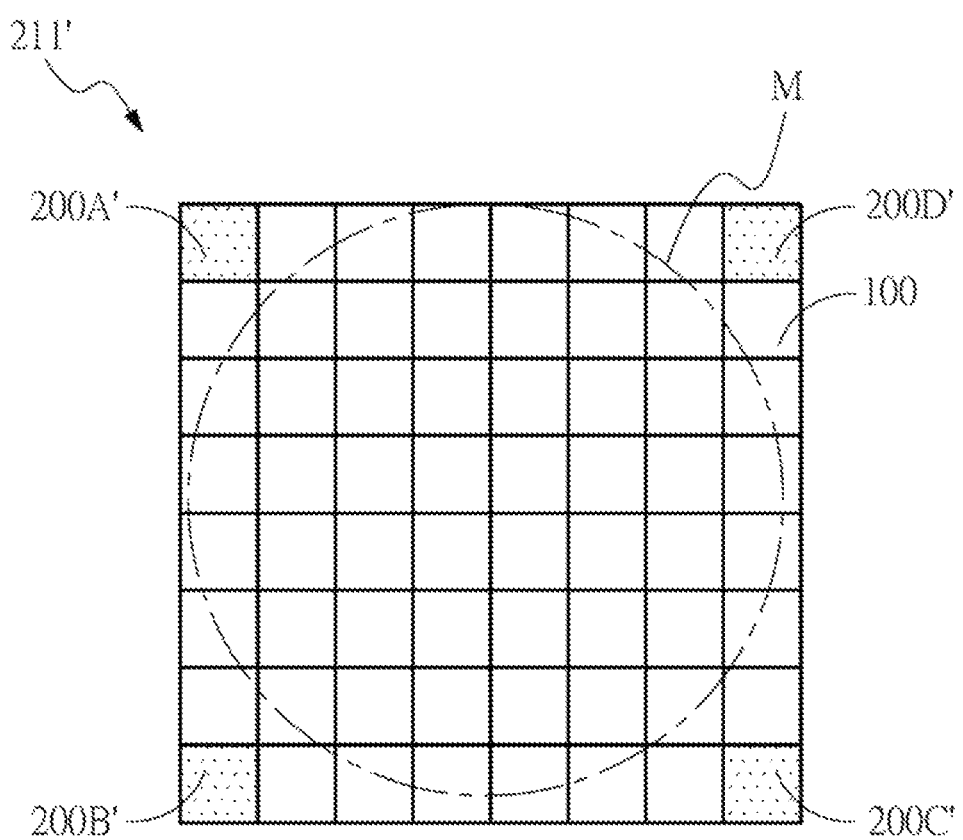
FIG. 1B is a schematic diagram of exemplary brightness compensation detection by a photographing unit.

However, referring to FIG. 1B, currently, a Demura device generally requires a camera (brightness obtaining apparatus 2) capable of accurately photographing a pixel unit (that is, the first pixel unit 100 of the to-be-compensated panel 1). In this way, an advantage is that a most accurate value of a to-be-compensated position (Mura) can be obtained. However, high requirements are raised on a resolution and calculating and processing capabilities of a camera, and because relatively small Mura cannot be detected, no brightness compensation is performed, and a compensation capability is lacked.

As shown in FIG. 1B, using a first resolution 10 in FIG. 1A being an ultrahigh resolution (3840*2160) as an example, currently, in a Demura camera (brightness obtaining apparatus 2) every 8 first pixel units 100 in both a horizontal direction and a vertical direction are a photographing unit 211', and using the photographing unit 211' as a reference, a mathematical operation is performed to further obtain brightness compensation data of each first pixel unit 100. First 8×8 photographing units 211 on the uppermost leftmost corner of a brightness compensation reference frame 21 in FIG. 1A are used as an example. Brightness values of four pixel units, namely, a second pixel unit 200A' on the upper left, a second pixel unit 200B' on the lower left, a second pixel unit 200C' on the lower right, and a second pixel unit 200D' on the upper right, as reference points of the photographing unit 211 are obtained, and a compensation value of a first pixel unit 100 corresponding to each second pixel unit in the 8×8 area is obtained according to the brightness values of the four reference points by means of a linear operation. As shown in the figure, a circle in the middle is a to-be-compensated position M with non-uniform brightness, so that brightness compensation data of the to-be-compensated position M is obtained by performing linear calculation on the four reference second pixel units 200A' to 200D'. Such an approach may be accurately applied to a single first pixel unit 100 corresponding to the to-be-compensated panel 1, and may produce a relatively brightness compensation effect for a relatively large compensation position M, but raises a relatively high requirement on the resolution of the brightness obtaining apparatus 2 at the same time. Meanwhile, assuming that the compensation position M is relatively small and is just smaller than 8×8 units, the brightness obtaining apparatus 2 cannot capture the compensation position M, and such a compensation mechanism cannot produce a good compensation effect.

Figure 1C:
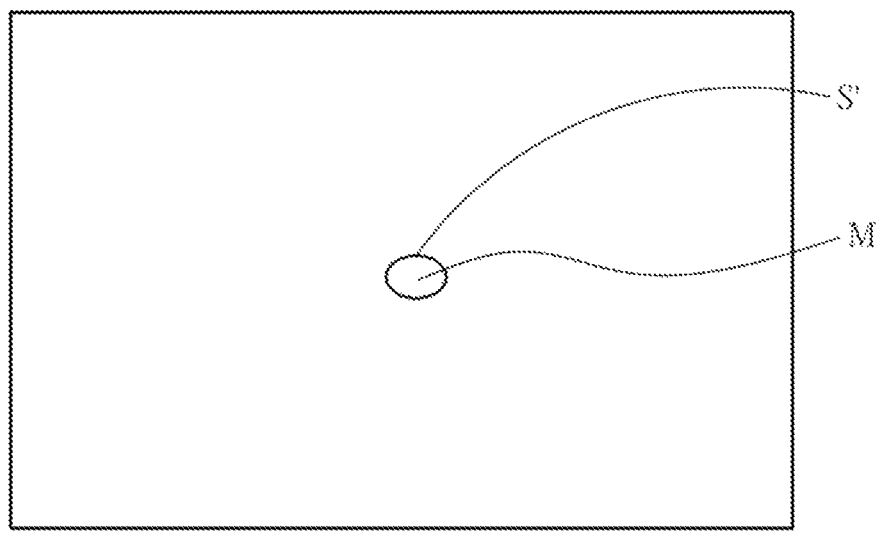
FIG. 1C is a schematic diagram of exemplary reference point sampling.

However, currently, in this technology, a central area of a to-be-compensated panel 1 is used as a reference point S', as shown in FIG. 1C. Comparison is performed to obtain a difference between brightness of the to-be-compensated position M and brightness of a central reference point S, and further, a specific operation mode f as shown in FIG. 1E is applied to a compensation reference curve C (for example, the standard gamma curve, that is, the gamma 2.2 curve) to calculate brightness compensation data D needing to be compensated for (including compensation brightness D1 and a compensation gray level D2), thereby achieving brightness uniformity of the entire panel.

Figure 1D:
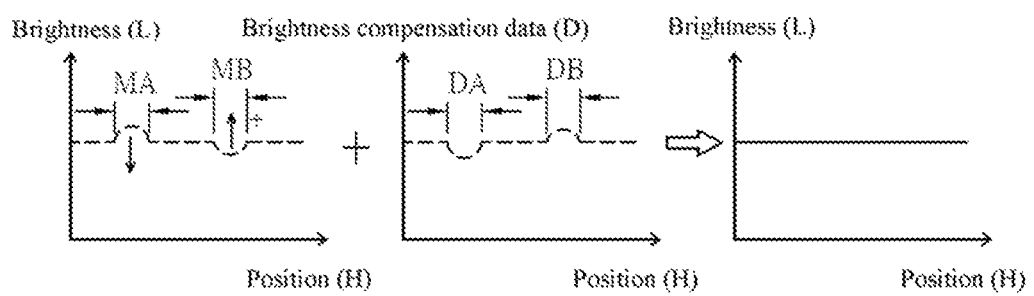
FIG. 1D is a schematic diagram of a working principle of a brightness compensation technology.
Figure 1E:
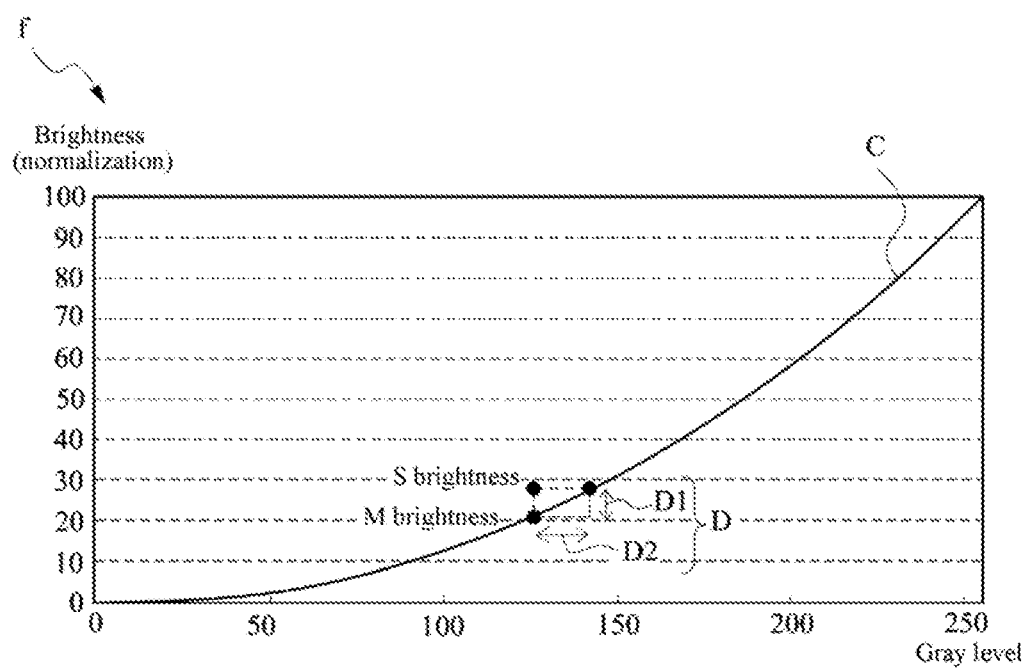
FIG. 1E is a schematic diagram of a calculation principle of brightness compensation data.

FIG. 1D is a schematic diagram of a working principle of a brightness compensation technology (Demura). A brightness compensation device, as shown in FIG. 1A, photographs a display status of the entire to-be-compensated panel 1 by using the brightness obtaining apparatus 2, to obtain a brightness (L)-position (H) brightness curve graph on the left side of FIG. 1D, and after analysis and calculation of Demura, performs data compensation (compensation data DA compensation data DB in the curve graph in the middle) for two areas (a to-be-compensated position MA and a to-be-compensated position MB) in the curve. That is, display data (the curve graph on the right side) of the area is a sum of original data (the curve graph on the left side) and compensation data (the curve graph in the middle). The compensation data DA for the to-be-compensated position MA is a negative number, that is, the display data is decreased. The compensation data DB corresponding to the to-be-compensated position MB may be increased correspondingly. In this way, uniform brightness may be finally obtained, to remove Mura.

At present, this approach is relatively simple and easy. However, a premise of calculating the brightness compensation data D is assuming that the to-be-compensated panel 1 is already of a standard gamma 2.2 curve. However, in an actual production process of panels, it is impossible to perform accurate management and control on a gamma curve of each panel. In addition, a to-be-compensated position M at a central point usually cannot be removed (as shown in FIG. 1C). Consequently, a final effect of Demura is relatively likely to be affected.

Meanwhile, calculation is performed for each photographing unit 211 by default, and in addition, to ensure a Demura effect, a smallest photographing unit 211 in an area of a to-be-compensated position M cannot be excessively large (usually including 8*8 first pixel units). Therefore, a volume of final brightness compensation data D of the entire to-be-compensated panel is relatively large, and accordingly, an external memory 121 (Demura flash) needs to have a relatively large capacity, an internal RAM of a processing IC on a driver board also needs to be relatively large, and further, limitations in a data transmission time and rate would be caused. Using an ultrahigh resolution (3840*2160) in FIG. 1A as an example, currently, the smallest brightness compensation photographing unit 211 includes 8*8 first pixel units 100. That is, every 8 first pixel units 100 in both a horizontal direction and a vertical direction are obtained as a compensation point. Using the compensation point as a reference, brightness compensation data D of each first pixel unit 100 obtained in a specific operation mode fin actual application. Currently, in this method, a quantity of photographing units 211 is 481*271, and brightness compensation data D of each photographing unit 211 is 12 bits, so that a total data volume is 481*271*12=1.49 Mb. Meanwhile, to satisfy compensation requirements of different gray levels, usually, frames on three different gray levels are used as compensation reference, so that 481*271*12*3=4.48 Mb. That is, a smallest capacity of a brightness compensation memory of the brightness compensation data D needs to be greater than 4.48 Mb.

Figure 2:
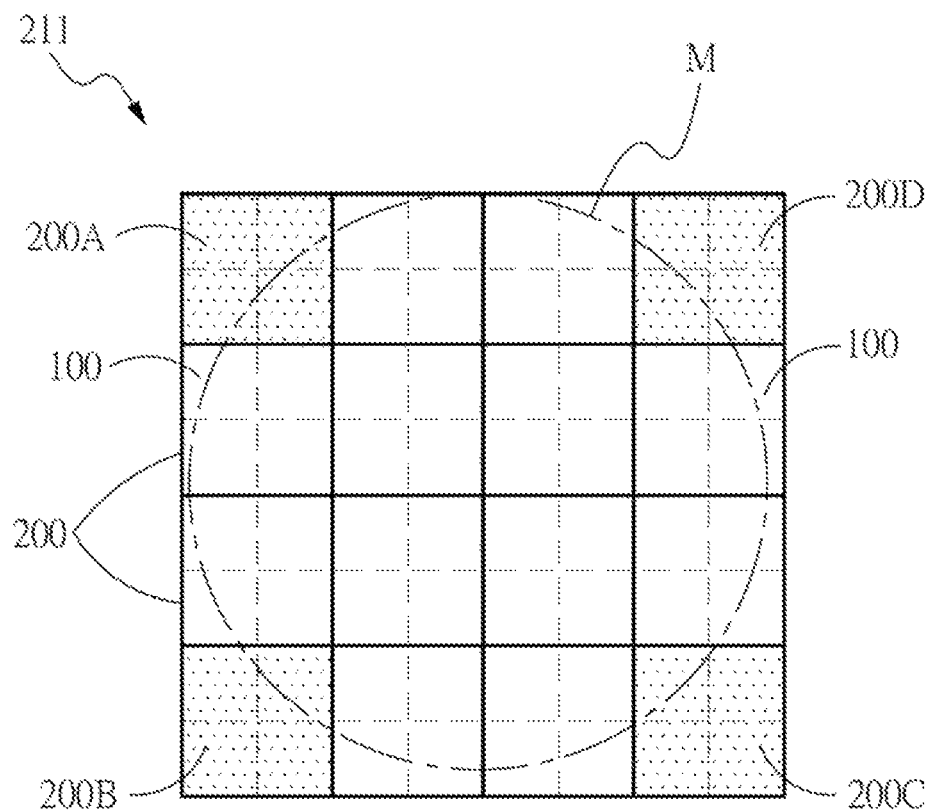
FIG. 2 is a schematic diagram of brightness compensation detection by a photographing unit according to an embodiment of the present invention.

Continuously referring to FIG. 2, FIG. 2 is a schematic diagram of brightness compensation detection by a photographing unit according to an embodiment of the present invention.

The technical problem resolved by the present invention is to use an optimization method for achieving brightness compensation by changing a camera resolution. As shown in FIG. 2, a basic pixel unit (that is, a second pixel unit 200 in a solid line box) of the smallest photographing unit 211 of the camera is enlarged from the single first pixel unit 100 (a dashed line box) shown in FIG. 1B to 2×2 first pixel units 100. The camera would integrate brightness in the second pixel unit 200 having a size of 2×2 as a smallest unit of compensation calculation. In this way, the camera only needs to clearly capture the area of 2×2 first pixel units, and the resolution may be reduced to ¼ of the original resolution, thereby greatly reducing a requirement on the Demura camera, and also greatly lowering costs of the device.

Meanwhile, this solution also enhances a capability of compensating for a to-be-compensated position M with a relatively small scope. If the second pixel units 200A' to 200D' in FIG. 1B are used as reference point, the to-be-compensated position M would not be detected, and a compensation effect is relatively poor. Moreover, by using a design idea of the present invention, a size of the second pixel unit 200 may be enlarged from a single first pixel unit 100 to 2×2 first pixel unit 100, so as to detect the to-be-compensated position M, thereby performing relatively good compensation. Actually, the to-be-compensated position M is a regional distribution, using a high-resolution (a pixel unit has a small scope) camera to detect a single pixel unit is meaningless, and by taking such a fuzzification approach, better detection and determination are performed on the to-be-compensated position M to some extent. By changing the camera resolution, a requirement on a resolution specification of a Demura camera can be lowered, and a brightness compensation capability for small Mura can be enhanced in the present invention.

That is, the present invention provides an optimization method for brightness compensation, referring to FIG. 1A, including: providing a brightness obtaining apparatus 2; photographing, by the brightness obtaining apparatus 2, a to-be-compensated panel 1 to obtain a brightness compensation reference frame 21, where the to-be-compensated panel 1 has a first resolution 10, the first resolution 10 is defined by a plurality of first pixel units 100 of a two-dimensional array, the brightness obtaining apparatus 1 has a second resolution 20, the second resolution 20 is defined by a plurality of second pixel units 200 of a two-dimensional array, the brightness compensation reference frame 21 includes a plurality of photographing units 211, and the photographing unit 211 includes the plurality of second pixel units 200, where the second pixel unit 200 is bigger than the first pixel unit 100; using four second pixel units 200A to 200D at four endpoints of each of the photographing units 211 as brightness references, and obtaining a plurality of pieces of brightness compensation data D of the other second pixel units 200 in the photographing unit 211 by using a specific operation mode f; and performing brightness compensation for the first pixel units 100 corresponding to each of the photographing units 211 by using the pieces of brightness compensation data D.

In an embodiment of the present invention, the brightness obtaining apparatus 2 is a capacitive coupling component camera.

In an embodiment of the present invention, the first resolution 10 is an ultrahigh resolution defined by first pixel units 100 arranged in a 3840*2160 array.

In an embodiment of the present invention, side lengths of the second pixel unit 200 are respectively two times side lengths of the first pixel unit 100.

In an embodiment of the present invention, a quantity of second pixel units 200 defining the second resolution 20 is ¼ of a quantity of first pixel units 100 defining the first resolution 10.

In an embodiment of the present invention, the specific operation mode f is a linear operation.

The objective of the present invention may further be achieved and the technical problem of the present invention may further be resolved by taking the following technical measures.

The present invention provides a pre-stage device for brightness compensation, including: a to-be-compensated panel 1, having a first resolution 10, where the first resolution 10 is defined by a plurality of first pixel units 100 of a two-dimensional array; and a brightness obtaining apparatus 2, having a second resolution 20, where the second resolution 20 is defined by a plurality of second pixel units 200 of a two-dimensional array, and configured to photograph the to-be-compensated panel 1 to obtain a brightness compensation reference frame 21, where the brightness compensation reference frame 21 includes a plurality of photographing units 211, and the photographing unit 211 includes a plurality of second pixel units 200, where the second pixel unit 200 is bigger than the first pixel unit 100.

In the foregoing embodiment of the present invention, the brightness obtaining apparatus 2 is a capacitive coupling component camera.

Upon improvement in the present invention, the foregoing apparatus application problem is effectively overcome, and further, such an apparatus may be configured to enhance a capability of compensating for small Mura while reducing a resolution of a Demura camera by comprehensively determining brightness of the second pixel unit 200 enlarged to a size of 2×2 first pixel units 100.

Figure 3A:
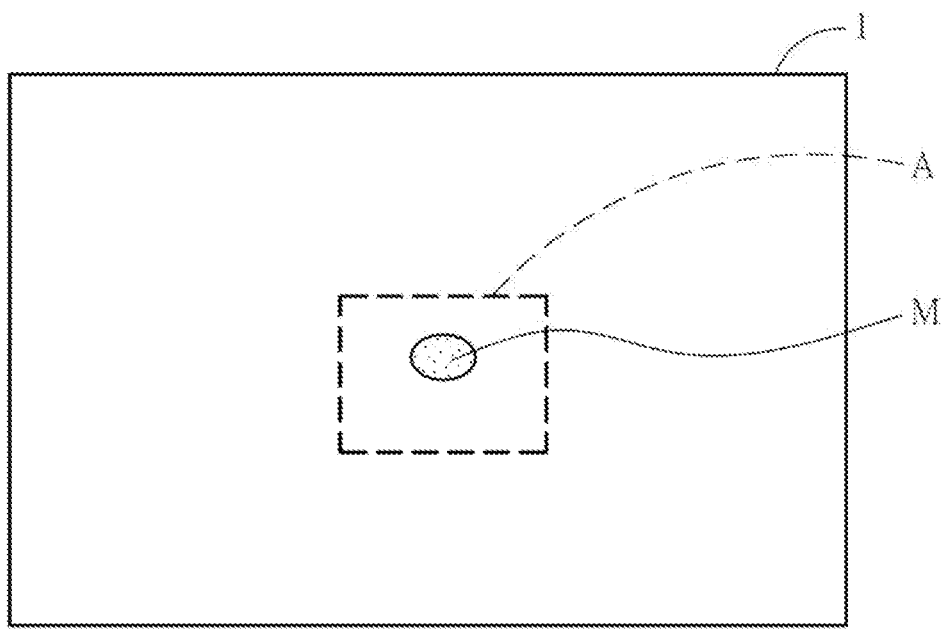
FIG. 3A is a schematic diagram of a compensation reference sampling area according to an embodiment of the present invention.
Figure 3B:
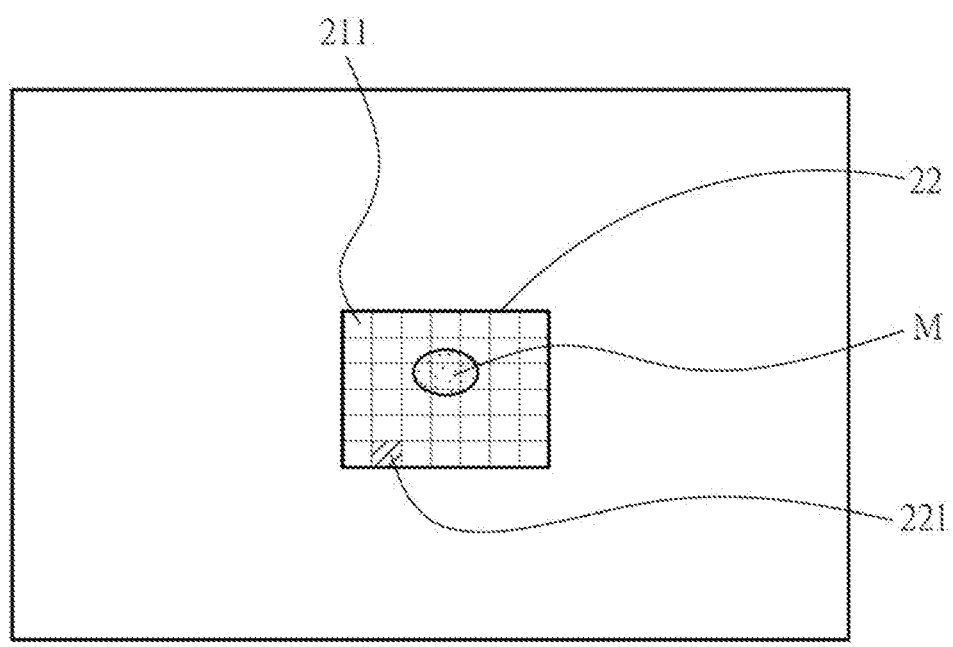
FIG. 3B is a schematic diagram of a sampling and photographing unit according to an embodiment of the present invention.

Continuously referring to FIG. 3A and FIG. 3B, FIG. 3A and FIG. 3B are a schematic diagram of a compensation reference sampling area and a schematic diagram of a sampling and photographing unit according to an embodiment of the present invention.

To resolve the technical problem of the present invention, the present invention uses an optimization method for brightness compensation by measuring a reference point sampling area in advance. As shown in FIG. 3A, in the present invention, before brightness compensation is performed, a relatively large central area is first obtained from the to-be-compensated panel 1 as a compensation reference sampling area A to photograph the compensation reference sampling area A to obtain a sampling frame 22 as shown in FIG. 3B. The size of the compensation reference sampling area A can be set according to an actual requirement. After the photographing, brightness uniformity of the area of the entire sampling frame 22 is first measured by using the brightness measurement unit 3 in FIG. 1A. If a non-uniform status is detected, it is considered that Mura occurs, and then, the camera needs to avoid the to-be-compensated position M having Mura, and use an other relatively uniform photographing unit 211 in the compensation reference sampling area A as a sampling and photographing unit 221 serving as a compensation reference, so that the problem that Mura may exist at a reference point S' in FIG. 1C (that is, the to-be-compensated position M) is resolved. Meanwhile, to ensure compensation accuracy, brightness of the compensation reference sampling area A is also sampled, and then, a brightness compensation value of the sampling and photographing unit 221 may be calculated according to a compensation reference curve C (for example, the gamma 2.2 curve) as shown in FIG. 1E, so that the sampling and photographing unit 221 actually achieves a perfect target of the gamma 2.2. In this way, when compensation is performed for other to-be-compensated areas of the panel, the brightness compensation data D obtained by calculation by directly using the gamma 2.2 as a target is accurate, and a compensation effect is also the best.

That is, the present invention provides an optimization method for brightness compensation, as shown in FIG. 1A, including: setting a compensation reference sampling area A on a to-be-compensated panel 1, where the to-be-compensated panel 1 has a first resolution 10, and the first resolution 10 is defined by a plurality of first pixel units 100 of a two-dimensional array; providing a brightness obtaining apparatus 2, and photographing, by the brightness obtaining apparatus 2, the compensation reference sampling area A to obtain a sampling frame 22, where the sampling frame 22 includes a plurality of photographing units 211, and the pieces of photographing units 211 may correspond to a plurality of first pixel units 100 included in the compensation reference sampling area A, where each photographing unit 211 may correspond to a plurality of first pixel units 100; measuring brightness uniformity of all of the photographing units 211 in the sampling frame 22, selecting one of the photographing units 211 having good brightness uniformity as a sampling and photographing unit 221, and using brightness of the sampling and photographing unit 221 as a compensation reference value; applying the compensation reference value according to a specific operation mode f to obtain a compensation reference curve C; photographing, by the brightness obtaining apparatus 2, the to-be-compensated panel 1 to obtain a brightness compensation reference frame 21, where the brightness compensation reference frame 21 includes a plurality of photographing units 211; applying brightness of all photographing units 211 in the brightness compensation reference frame 21 to the compensation reference curve C, and calculating a plurality of pieces of brightness compensation data D of the first pixel units 100 corresponding to the photographing units 211; and performing brightness compensation for the first pixel units 100 according to the pieces of brightness compensation data D.

In an embodiment of the present invention, the compensation reference sampling area A is in a central area of the to-be-compensated panel 1.

In an embodiment of the present invention, the brightness obtaining apparatus 2 is a capacitive coupling component camera.

In an embodiment of the present invention, each photographing unit 211 may correspond to 8×8 first pixel units.

In an embodiment of the present invention, the first resolution 10 is an ultrahigh resolution defined by first pixel units 100 arranged in a 3840*2160 array.

In an embodiment of the present invention, the specific operation mode f is estimating the compensation reference curve C according to a gamma value and target brightness.

In an embodiment of the present invention, the specific operation mode f is a gamma 2.2 curve.

The objective of the present invention may further be achieved and the technical problem of the present invention may further be resolved by taking the following technical measures.

The present invention provides an optimization device for brightness compensation, including: a to-be-compensated panel 1, having a first resolution 10, where the first resolution 10 is defined by a plurality of first pixel units 100 of a two-dimensional array; a brightness obtaining apparatus 2, configured to photograph the to-be-compensated panel 1 to obtain a sampling frame 22, the sampling frame 22 includes a plurality of photographing units 211, and the photographing units 211 may correspond to the plurality of first pixel units 100; a brightness measurement unit 3, configured to measure brightness uniformity of the photographing units 211 in the frame and obtain a sampling and photographing unit 211; a brightness comparison unit 4, configured to perform comparison to obtain a difference between brightness of each of the photographing units 211 and the sampling and photographing unit 211; a calculation unit 5, calculating, according to the difference between brightness of each of the photographing units 211 and the sampling and photographing unit 211, a plurality of brightness compensation data D of each of the photographing units 211; and a brightness compensation unit 6, increasing or decreasing brightness of each of the first pixel units 100 according to the pieces of brightness compensation data D, and performing positive-direction or negative-direction brightness compensation for each of the first pixel units 100.

Upon improvement in the present invention, the foregoing apparatus application problem is effectively overcome, and further, such an apparatus may be configured to measure and compensate for a gamma curve at a center of a panel in advance by measuring a compensation reference sampling area A in advance, and remove Mura at the center of the panel to make the gamma curve achieve the standard gamma 2.2, thereby achieving a most accurate compensation effect.

Figure 4A:
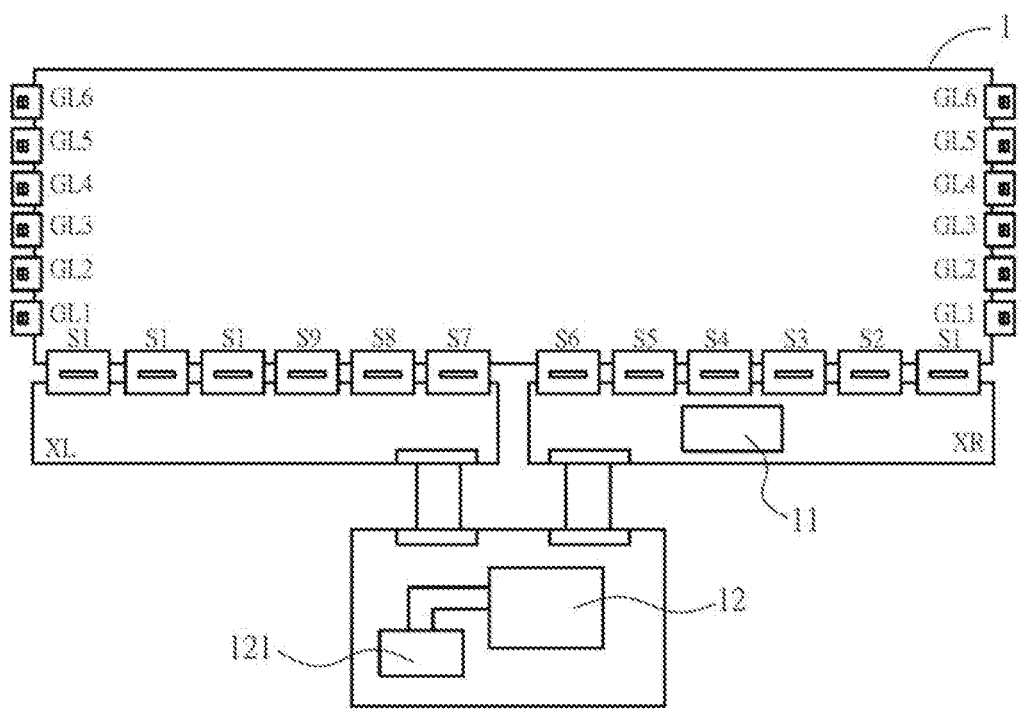
FIG. 4A is a schematic structural diagram of an externally-connected data processor according to an embodiment of the present invention.
Figure 4B:
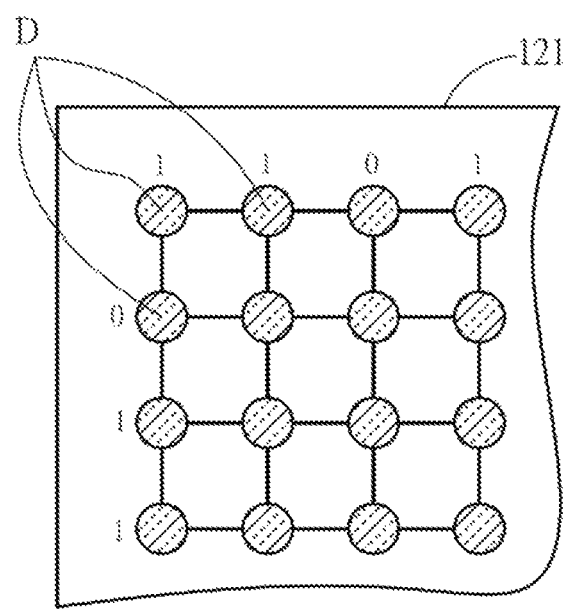
FIG. 4B is a schematic diagram of data storage of an external memory according to an embodiment of the present invention.
Figure 4C:
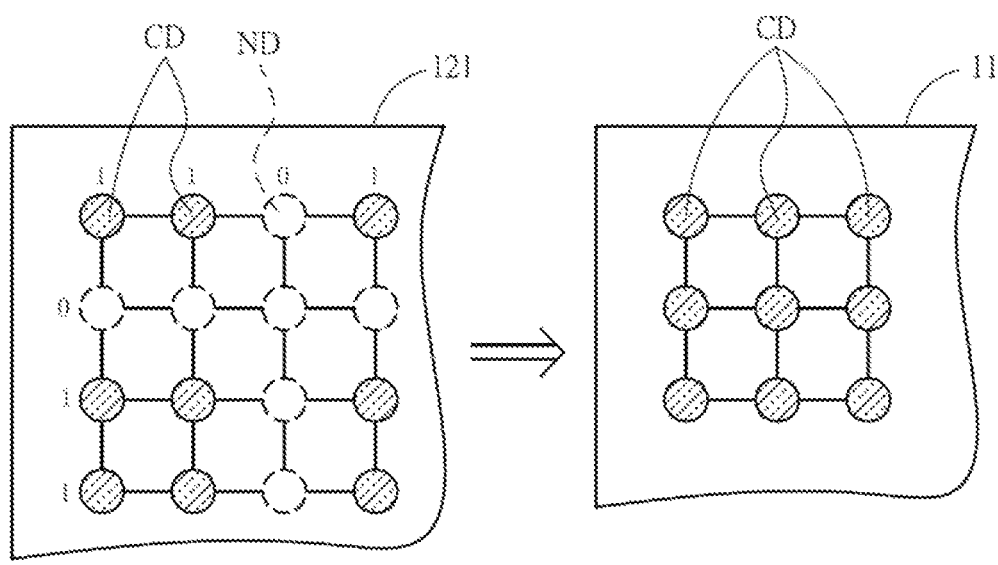
FIG. 4C is a schematic diagram of data storage of a brightness compensation data memory according to an embodiment of the present invention.

Continuously referring to FIG. 4A to FIG. 4C, FIG. 4A to FIG. 4C are a schematic structural diagram of an externally-connected data processor, a schematic diagram of data storage of an external memory, and data storage of a brightness compensation data memory according to an embodiment of the present invention.

To resolve the technical problem of the present invention, the present invention uses an optimization method for a brightness compensation data volume implemented by using information stored in an external memory. In the present invention, determination information indicating whether compensation is needed in stored in an external memory 121, 1 is used to represent to-be-compensated data CD, and 0 is used to represent not-to-be-compensated data ND. Therefore, a brightness compensation data memory 11 only needs to sequentially store pieces of to-be-compensated data CD of areas indeed needing compensation. An externally-connected data processor 12 (for example, a timing controller) may correctly make to-be-compensated areas correspond to brightness compensation data D one by one according to the set determination information. For photographing units needing no compensation, the TCON stores the not-to-be-compensated data ND as 0.

As shown in FIG. 4B, the external memory 121 stores a piece of 4*4 brightness compensation data D, and if the data D in a horizontal direction is 1101, indicating that the third point in the horizontal direction is not-to-be-compensated data ND (as shown in FIG. 4C), that is, a compensation value, other three points are to-be-compensated data CD. If the data D in a vertical direction is 1011, that is, the second point is not-to-be-compensated data ND, other three points are to-be-compensated data CD. Moreover, a corresponding brightness compensation memory 11 only needs to, as shown in FIG. 4C, store a quantity of pieces of 3*3 to-be-compensated data CD, respectively corresponding points being 1 in the brightness compensation data D in the external memory 121.

In this solution, only an existing Demura program is needed to determine a difference between a to-be-compensated position and a reference point, and a standard of compensation may be determined according to an actual production status. If the difference is relatively small, it is considered that compensation is not needed, and 0 is written at a corresponding position in the external memory 121, and if the difference is relatively large, 1 is written at a corresponding position in the external memory 121. Subsequently, only pieces of data of points needing compensation determined after the determination need to be stored sequentially in the brightness compensation memory 11. In this way, an extra data volume needed by the external memory 121 of the data processor 12 is 481*271*1*3=0.37 Mb, the data volume is extremely small, and a requirement on the external memory 121 is not extremely high. Meanwhile, in the correspondingly brightness compensation memory 11, only the to-be-compensated data CD needs to be stored. Although a reduction magnitude of a total volume of brightness compensation data D is related to a status of the to-be-compensated position M of the panel, in an actual production process, a capacity of the brightness compensation memory 11 may be determined according to actual Mura status distribution of the panel, and as the Mura status of the panel is alleviated, a needed compensation volume becomes smaller. That is, in the present invention, a difference between brightness of each to-be-compensated position area and brightness of a reference point may be determined by using information stored in an external memory, and no compensation is made for an area of a to-be-compensated position having a relatively small difference, so that a total brightness compensation data volume of Demura is reduced.

That is, the present invention provides an optimization method for a brightness compensation data volume, as shown in FIG. 1A, including: providing a to-be-compensated panel 1, where the to-be-compensated panel 1 has a brightness compensation data memory 11, storing a plurality of pieces of brightness compensation data D of the to-be-compensated panel; externally connecting a data processor 12, where the data processor 12 includes an external memory 121, and the external memory 121 stores a piece of determination information for determining whether the pieces of brightness compensation data D need to be compensated; reading, by the data processor 12, the pieces of brightness compensation data, classifying, according to the determination information, the pieces of brightness compensation data D into a plurality of pieces of to-be-compensated data CD and a plurality of pieces of not-to-be-compensated data ND, and storing the plurality of pieces of to-be-compensated data CD and not-to-be-compensated data ND in the external memory 121; and reading and storing, by the brightness compensation data memory 11, the pieces of to-be-compensated data CD in the external memory 121.

In an embodiment of the present invention, the brightness compensation data memory 11 compares brightness of a reference point S of the to-be-compensated panel 1 with brightness of a plurality of to-be-compensated positions M, and calculates, according to a specific operation mode f, a plurality of pieces of brightness compensation data D corresponding to the plurality of to-be-compensated positions M.

In an embodiment of the present invention, the specific operation mode f is a gamma 2.2 curve.

In an embodiment of the present invention, the data processor 12 is a timing controller.

In an embodiment of the present invention, according to the determination information, the to-be-compensated data CD is determined to be 1, and the not-to-be-compensated data ND is determined to be 0.

In an embodiment of the present invention, the brightness compensation data memory 11 reads and stores pieces of data determined to be 1 in the external memory 121.

The objective of the present invention may further be achieved and the technical problem of the present invention may further be resolved by taking the following technical measures.

The present invention provides an optimization device for a brightness compensation data volume, including: a to-be-compensated panel 1, including a brightness compensation data memory 11, storing a plurality of brightness compensation data D; a data processor 12, externally connected to the to-be-compensated panel 1 and configured to read the pieces of brightness compensation data D; and an external memory 121, storing a piece of determination information, provided to the data processor 12 for determining the pieces of brightness compensation data D to be a plurality of pieces of to-be-compensated data CN and a plurality of pieces of not-to-be-compensated data ND, where the brightness compensation data memory 11 may read and store the pieces of to-be-compensated data CD in the external memory 121.

In the foregoing embodiment of the present invention, the data processor 12 is a timing controller.

Upon improvement in the present invention, the foregoing apparatus application problem is effectively overcome, and further, such an apparatus may be configured to determine a difference between brightness in an area of each to-be-compensated position M and brightness of a reference point S (and a sampling and photographing unit 221) by using information stored in an external memory 121, and make no compensation for an area of a to-be-compensated position M having a relatively small difference, so as to reduce a total brightness compensation data volume of Demura.

The wordings such as "in some embodiments" and "in various embodiments" are repeatedly used. The wordings usually refer to different embodiments, but they may alternatively refer to a same embodiment. The words, such as "comprise", "have", and "include", are synonyms, unless other meanings are indicated in the context thereof.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above disclosed technical content without departing the scope of the technical solutions of the above disclosed technical content to obtain equivalent embodiments. Any simple alteration, equivalent change or modification made to the foregoing embodiments according to the technical essence of the present disclosure without departing from the content of the technical solutions of the present disclosure shall fall within the scope of the technical solutions of the present disclosure.

What is claimed is:

1. An optimization method for brightness compensation, comprising:

providing a brightness obtaining apparatus;

photographing, by the brightness obtaining apparatus, a to-be-compensated panel to obtain a brightness compensation reference frame, wherein the to-be-compensated panel has a first resolution, the first resolution is defined by a plurality of first pixel units of a two-dimensional array, the brightness obtaining apparatus has a second resolution, the second resolution is defined by a plurality of second pixel units of a two-dimensional array, the brightness compensation reference frame comprises a plurality of photographing units, and the photographing unit comprises a plurality of second pixel units, wherein the second pixel unit is bigger than the first pixel unit;

using four second pixel units at four endpoints of each of the photographing units as brightness references, and obtaining a plurality of pieces of brightness compensation data of the other second pixel units in the photographing unit by using a specific operation mode; and performing brightness compensation for the first pixel units corresponding to each of the photographing units by using the pieces of brightness compensation data;

wherein side lengths of the second pixel unit are respectively two times side lengths of the first pixel unit;

wherein a quantity of second pixel units defining the second resolution is ¼ of a quantity of first pixel units defining the first resolution;

wherein the specific operation mode is a gamma 2.2 curve.

2. The optimization method for brightness compensation according to claim 1, wherein the brightness obtaining apparatus is a capacitive coupling component camera.

3. The optimization method for brightness compensation according to claim 1, wherein the first resolution is an ultrahigh resolution defined by first pixel units arranged in a 3840*2160 array.

4. The optimization method for brightness compensation according to claim 1, wherein the pieces of brightness compensation data perform positive-direction brightness compensation for the first pixel units corresponding to each of the photographing units.

5. The optimization method for brightness compensation according to claim 1, wherein the pieces of brightness compensation data perform negative-direction brightness compensation for the first pixel units corresponding to each of the photographing units.

* * * * *